United States Patent
Hwang et al.

(10) Patent No.: US 9,119,149 B2
(45) Date of Patent: Aug. 25, 2015

(54) METHOD AND APPARATUS OF SENSOR NETWORK SUPPORTING BIDIRECTIONAL EVENT DETECTION

(75) Inventors: Hyo Sun Hwang, Seoul (KR); Chi Sung Bae, Yongin-si (KR); Seung Ku Kim, Seoul (KR); Jae Ho Lee, Seoul (KR); Doo Seop Eom, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 106 days.

(21) Appl. No.: 13/428,059

(22) Filed: Mar. 23, 2012

(65) Prior Publication Data

US 2012/0243454 A1 Sep. 27, 2012

(30) Foreign Application Priority Data

Mar. 24, 2011 (KR) .................... 10-2011-0026437

(51) Int. Cl.
*G08C 17/00* (2006.01)
*H04W 52/02* (2009.01)
*H04W 56/00* (2009.01)
*H04W 84/18* (2009.01)

(52) U.S. Cl.
CPC ...... *H04W 52/0229* (2013.01); *H04W 56/0045* (2013.01); *H04W 84/18* (2013.01); *Y02B 60/50* (2013.01)

(58) Field of Classification Search
CPC .................... H04W 52/0225; H04W 52/0229; H04W 52/0251; H04W 56/001; H04W 56/004; H04W 56/0045; H04W 56/005; H04W 56/0055; H04W 56/0095
USPC .......................................... 370/311, 338, 350
See application file for complete search history.

(56) References Cited

U.S. PATENT DOCUMENTS

| | | | |
|---|---|---|---|
| 7,068,702 B2 * | 6/2006 | Chen et al. .................... | 375/132 |
| 7,069,325 B1 * | 6/2006 | Lu et al. ........................ | 709/226 |
| 7,873,849 B2 * | 1/2011 | Mucignat et al. ............. | 713/323 |
| 2004/0240478 A1 * | 12/2004 | Goren et al. ................... | 370/503 |
| 2004/0242256 A1 * | 12/2004 | Xiao et al. ..................... | 455/522 |
| 2005/0226141 A1 * | 10/2005 | Ro et al. ........................ | 370/203 |
| 2008/0075094 A1 * | 3/2008 | Ahn et al. ...................... | 370/400 |

(Continued)

FOREIGN PATENT DOCUMENTS

| | | |
|---|---|---|
| JP | 2009-055301 | 3/2009 |
| JP | 2009-253360 | 10/2009 |

(Continued)

*Primary Examiner* — Kan Yuen
(74) *Attorney, Agent, or Firm* — NSIP Law (57) ABSTRACT

A communication method of a coordinator in a bidirectional event transmission sensor network comprising a sensor node and the coordinator is provided. The method includes sensing, in an uplink section, whether a signal having energy greater than or equal to a predetermined magnitude is received, the signal indicating occurrence of an uplink event detected by the sensor node, and transmitting, to the sensor node in a downlink section, a synchronization packet that is used for receiving the uplink event or for transmitting a downlink event in response to the coordinator detecting the downlink event or sensing the signal having energy greater than or equal to the predetermined magnitude in the uplink section. The bidirectional event transmission sensor network has a structure of a super frame that includes at least one standby slot (SS) including the uplink section and the downlink section.

17 Claims, 10 Drawing Sheets

(56) References Cited

U.S. PATENT DOCUMENTS

2009/0161687 A1* 6/2009 Yu et al. .................. 370/436
2011/0269393 A1* 11/2011 Ostergaard et al. ............ 455/7

FOREIGN PATENT DOCUMENTS

| KR | 1020090044277 | 5/2009 |
| KR | 1020090062547 | 6/2009 |

* cited by examiner

FIG. 1 (CONVENTIONAL ART)

downlink section.

FIG. 2

SS: STANDBY SLOT, GTS: GUARANTEED TRANSMISSION SLOT, AS: ACCESS SLOT, B: BEACON

METHOD AND APPARATUS OF SENSOR NETWORK SUPPORTING BIDIRECTIONAL EVENT DETECTION

CROSS-REFERENCE TO RELATED APPLICATION(S)

This application claims the benefit under 35 U.S.C. §119(a) of Korean Patent Application No. 10-2011-0026437, filed on Mar. 24, 2011, in the Korean Intellectual Property Office, the entire disclosure of which is incorporated herein by reference for all purposes.

BACKGROUND

1. Field

The following description relates to a method and an apparatus of a sensor network supporting bidirectional event detection.

2. Description of Related Art

In recent times, as sensor technologies have advanced and the demand for automatic processing has increased, wireless sensor network technologies have been utilized in various fields. In particular, sensors are used to sense a medical condition of a patient in health care, to sense a stability of a large construction, such as a building, a bridge, and the like, and to sense an intruder, and the like. An event sensed by a sensor may be transmitted through a communication module to a central monitoring system. Subsequently, the received event may be processed.

SUMMARY

As a general aspect, a communication method of a coordinator in a bidirectional event transmission sensor network including a sensor node and the coordinator is provided. The method includes sensing, in an uplink section, whether a signal having energy greater than or equal to a predetermined magnitude is received, the signal indicating occurrence of an uplink event detected by the sensor node, and transmitting, to the sensor node in a downlink section, a synchronization packet that is used for receiving the uplink event or for transmitting a downlink event in response to the coordinator detecting the downlink event or sensing the signal having energy greater than or equal to the predetermined magnitude in the uplink section. The bidirectional event transmission sensor network has a structure of a super frame that includes at least one standby slot (SS) including the uplink section and the downlink section.

The sensing may include maintaining a wake-up mode in the uplink section, to sense whether the uplink event occurs.

The sensing may include recognizing that the uplink event occurs in response to the signal having energy greater than or equal to the predetermined magnitude being received during a predetermined time range.

The sensing may include recognizing that the uplink event does not occur in response to the signal having energy greater than or equal to a certain magnitude being received during a time greater than or equal to a threshold time.

A length of the SS may be determined, in advance, regardless of a number of sensor nodes included in the sensor network.

The transmitting may include transmitting the synchronization packet in the downlink section more than once.

The transmitting may include transmitting the synchronization packet including a code pattern for identifying the coordinator.

The method may further include receiving, in an access slot (AS) included in the super frame, an access request frame including identification information associated with the sensor node, from the sensor node that receives the synchronization packet.

The method may further include transmitting a beacon including scheduling information for transmitting the downlink event or for receiving the uplink event, in response to the reception of the access request frame, and performing, based on the scheduling information, transmission of the downlink event or reception of the uplink event from the sensor node.

The SS slot may be configured to process an aperiodic event.

The coordinator may be configured to distinguish interference from the signal based on the received signal having energy less than the predetermined magnitude.

As another general aspect, a communication method of a sensor node in a bidirectional event transmission sensor network including a sensor node and a coordinator is provided. The method includes informing, in an uplink section, the coordinator of whether an uplink event occurs, the uplink event being detected by the sensor node, and receiving, in a downlink section, a synchronization packet that is used for transmitting the uplink event or for receiving a downlink event, based on whether downlink transmission from the coordinator to the sensor node is sensed, the downlink event being detected by the coordinator. The bidirectional event transmission sensor network has a structure of a super frame that includes at least one SS including the uplink section and the downlink section.

The informing may include transmitting, to the coordinator, a signal having energy greater than or equal to a predetermined magnitude in response to the sensor node detecting the uplink event.

The informing may include changing a state of the sensor node from a sleep mode to a wake-up mode, to inform the coordinator that the uplink event occurs, and changing the state of the sensor node from the wake-up mode to the sleep mode after informing the coordinator of the occurrence of the uplink event.

The method may further include sensing, in the downlink section, the downlink transmission from the coordinator to the sensor node.

The receiving may include changing a state to a sleep mode in response to the downlink transmission not being sensed.

The synchronization packet may include a code pattern for identifying the coordinator.

The method may further include transmitting, to the coordinator in an access slot (AS) included in the super frame, an access request frame including identification information associated with the sensor node, in response to the reception of the synchronization packet.

The transmitting may include transmitting the access request frame using a section allocated to the sensor node among sections respectively allocated to sensor nodes included in the AS.

The method may further include receiving, from the coordinator, a beacon including scheduling information for transmitting the uplink event or for receiving the downlink event, and performing, based on the scheduling information, transmission of the uplink event to the coordinator or reception of the downlink event from the coordinator.

As another aspect, a communication method of a bidirectional event transmission sensor network including a plurality of sensor nodes and a coordinator is provided. The method includes transmitting, to the coordinator in an uplink section by each of at least one sensor node that detects an uplink event, a signal having energy greater than or equal to a predetermined magnitude, the signal indicating that the uplink event occurs, in response to the at least one sensor node among the plurality of sensor nodes detecting the uplink event, and transmitting, to the plurality of sensor nodes in a downlink section by the coordinator, a synchronization packet that is used for receiving the uplink event and for transmitting a downlink event in response to the signal having energy greater than or equal to the predetermined magnitude being sensed or the downlink event detected by the coordinator occurring. The bidirectional event transmission sensor network has a structure of a super frame that includes at least one SS including the uplink section and the downlink section.

The synchronization packet may include a code pattern used by the plurality of sensor nodes to identify the coordinator.

The method may further include transmitting, to the coordinator in an access slot (AS) included in the super frame by each of the plurality of sensor nodes, an access request frame including identification information associated with a corresponding sensor node in response to the reception of the synchronization packet.

The transmitting may include transmitting, by each of the plurality of sensor nodes, the access request frame using a section allocated to the corresponding sensor node among sections respectively allocated to the sensor nodes included in the AS.

The method may further include transmitting, to the plurality of sensor nodes by the coordinator, a beacon including scheduling information for transmitting the downlink event or for receiving the uplink event, in response to reception of the access request frame, and performing, based on the scheduling information, transmission of the downlink event from the coordinator to the plurality of sensor nodes or transmission of uplink event from the at least one sensor node detecting the uplink event to the coordinator.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Examples may be used for various wireless sensor monitoring systems, and may be implemented as chip-type hardware. The implementation as chip-type hardware may help low power consumption characteristics.

U-health care may relate to a medical environment that safely provides a patient with an appropriate medical service. The medical service may have no restrictions on time and space. U-health care may attach a plurality of sensors to a body of the patient to monitor their medical condition. U-health care may inform the patient of a medical examination result, a medical risk, and an appropriate action for the medical risk, using the attached sensors.

A wireless body area network (WBAN) may connect more than one device attached to a patient's clothes or a patient's body with each other and may communicate with the devices. The WBAN may be used for prophylaxis using a medical checkup or for continuously monitoring a medical condition of a patient, an elderly person, or an infirm person. In a non-medically related application, the WBAN may be used for collecting and analyzing information associated with a condition of a human body during exercise or training, and the WBAN may also be used for connecting a communication device or a computer, around a human body, to various information collecting devices. For example, an information collecting device may be a sensor node. The communication device or the computer may be able to communicate with the various information collecting devices and an external network.

A low power media access control (MAC) protocol associated with the WBAN may be used. A low power MAC protocol associated with a wireless sensor network (WSN) exists. As another aspect, an environment that uses the WSN is generally different from a WBAN environment. Thus, a new MAC protocol appropriate for the WBAN environment may be used.

A comparison of 5 various features between a WSN environment and a WBAN environment is provided below.

1) Architecture

All devices that are used in the WSN environment may function both as a sensor node and a coordinator, whereas devices that are used in the WBAN environment are either classified as a sensor node that is attached to a user's body or as a coordinator that is used for connecting with an external infrastructure.

2) Density

The WSN generally uses a plurality of sensor nodes, whereas the WBAN uses a sensor network that a relatively smaller number of sensor nodes in relation to the WSN, based on a demand of the user.

3) Data Rate

The WSN may operate based on an event occurring and thus, the WSN may aperiodically generate data. On the other hand, the WBAN may periodically monitor a condition of the user and thus, the WBAN may periodically generate data.

4) Latency

For situations, such as in an emergency, the WBAN may request a relatively lower latency than a latency in the WSN. The lower the latency the more power is generally required, and thus, the latency and the power may need to be appropriately adjusted based on the condition of the user.

5) Mobility

Generally, the WSN is associated with a relatively stationary environment. On the other hand, the WBAN is generally associated with an environment where movement more frequently occurs. As another aspect, the movement is an unusual event that occurs based on a network unit.

In the U-health care, energy may be consumed during at least three cases. The three cases include wireless communication, data processing, and data collecting. During the wireless communication, energy may be consumed by collision, idle listening, overhearing, control packet overhead, and the like. Improvements of energy efficiency may be an issue to the U-health care.

Therefore, the examples may provide an effective WBAN MAC protocol to reduce energy usage based on the differences in the environment between the WSN and the WBAN.

Figure 1:
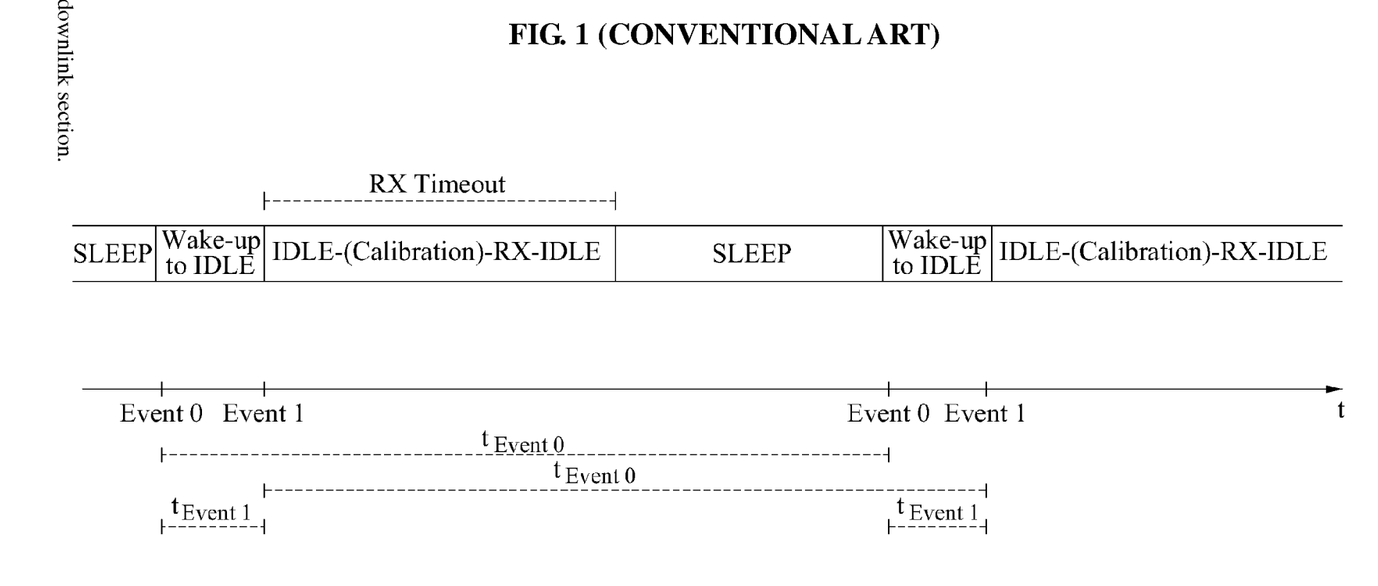
FIG. 1 is a diagram illustrating a change in a state of a transceiver based on a wake on radio (WOR) scheme.

FIG. 1 illustrates a change in a state of a transceiver based on a wake on radio (WOR) scheme.

Referring to FIG. 1, according to the WOR scheme, the transceiver may maintain a sleep mode state until data is received. In response to sensing the reception of the data, the transceiver may be automatically awakened. Thus, a micro controller unit (MCU) may not additionally control a transceiver mode. The transceiver mode may include a wake-up mode, a sleep mode, and the like.

The WOR scheme may operate a minimum module. The minimum module may sense an event in the sleep mode, and the WOR scheme may operate all modules included in the transceiver only in response to an event occurring and thus, energy may be consumed more economically.

Referring to FIG. 1, at an initial time, a majority of modules in the transceiver may be maintained to be in the sleep mode where the majority relates to more than half of the modules. The entire transceiver changes from a sleep mode state to an idle mode state based on an energy detection result of Event 0 and Event 1. In response to a receiving procedure being completed, the transceiver reverts from the idle mode state to the sleep mode state.

According to an example, a sensor network may include a single coordinator and a plurality of sensor nodes. A topology of the sensor network may be a star topology. As another aspect, other network topologies may also be utilized such as, for example, a linear topology and the like.

The coordinator may transmit events received from the sensor nodes to an external network. The coordinator may be a device, such as a mobile phone and may control the sensor nodes, based on a command from an external environment. For example, the command from the external environment may include user manipulation of a button on a mobile phone.

A sensor node may be a device that transmits, to the coordinator, an event. The event may be an uplink event, which may be sensed by the sensor node. For example, the uplink event may be information associated with a human body.

The sensor network may be a bidirectional event transmission sensor network. Events may occur in both the coordinator and the sensor node of the bidirectional event transmission sensor network. The coordinator and the sensor node may transmit their events to each other.

According to a conventional time decision multiple access (TDMA)-based MAC protocol, the coordinator may periodically transmitting a beacon to schedule a super-frame. As another aspect, the periodically transmitted beacon may generate control packet overhead. The periodically transmitted beacon may cause the coordinator and the sensor node to waste their energy. In response to a beacon period being extended to decrease the waste of energy, a latency may increase. Thus, an event occurring in the WBAN may not be sensed. The event may be an emergency notice by the sensor node, recognition of a user input button by the coordinator, and the like.

Therefore, examples may provide a TDMA-based WBAN MAC protocol that may increase a beacon transmission period and that may minimize a time that the sensor node is awakened to reduce energy consumption. The time that the sensor node is awakened may be a time where the sensor node is in a wake-up mode. The increased beacon transmission period may reduce a number of beacon transmissions. In the following examples, the coordinator may be assumed to be a device that has a sufficiently large energy capacity in comparison to an energy capacity of the sensor node.

Figure 2:
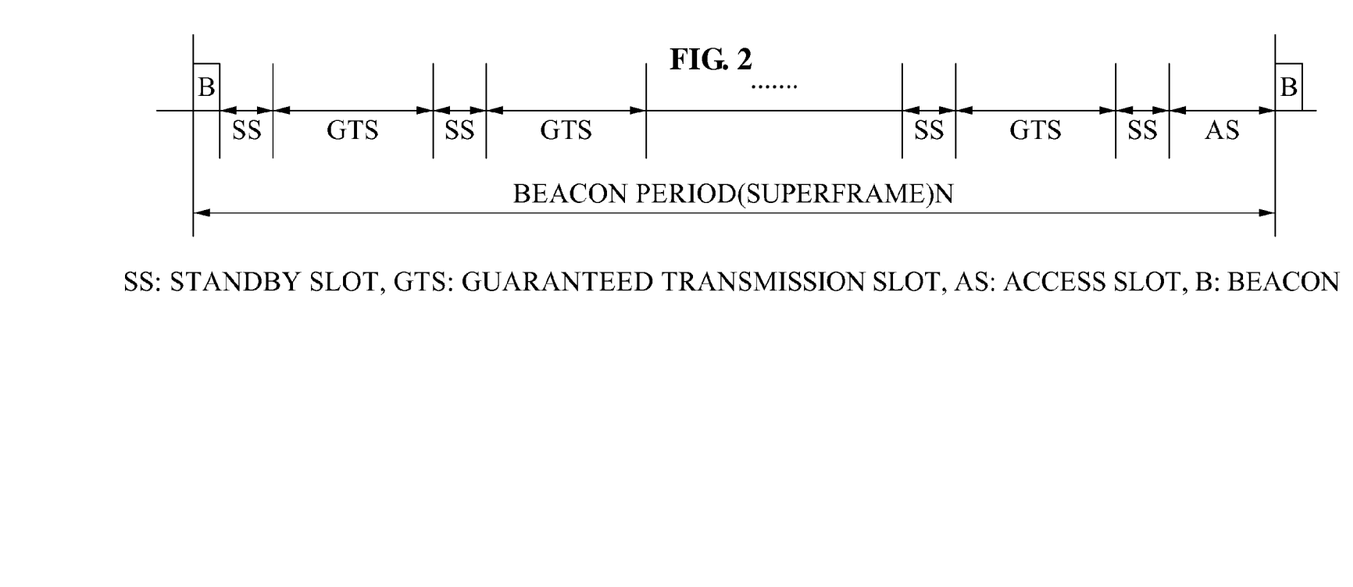
FIG. 2 is a diagram illustrating an example of a super frame of a sensor network.

FIG. 2 illustrates an example of a super-frame of a sensor network.

Referring to FIG. 2, the sensor network may use a super-frame having an extended beacon period to reduce a waste of energy caused by a beacon transmission. The sensor network may recognize an event in a coordinator and events in the sensor nodes using a standby slot (SS). The SS may be periodically allocated, based on a demand of an application, in a beacon period. The beacon period may be in the super-frame. Thus, the sensor network may reduce a time expended for sensing an event.

Figure 3:
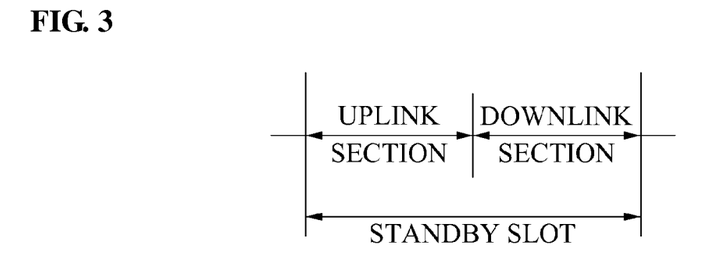
FIG. 3 is a diagram illustrating an example of a standby slot (SS)

FIG. 3 illustrates an example of an SS.

Referring to FIG. 3, the SS may be a slot for processing an unusual event. The SS may not process data that is periodically generated in a WBAN. The SS may include an uplink section and a downlink section.

The uplink section may sense an uplink event generated in a sensor node and may be notified of the uplink event. The downlink section may sense a downlink event generated in a coordinator, may be notified of the downlink event, and may be synchronized.

A period of the SS in a super-frame may correspond to a maximum allowable latency in response to an event being processed. A beacon transmission period and the period of the SS may be determined based on an application model.

The synchronization between the coordinator and the sensor node in the SS may not be matched due to a relatively long beacon transmission period of the super frame. A synchronization error may be determined based on an operating environment and performance of hardware of the coordinator and the sensor node. The operating environment and the performance of the hardware of the coordinator and the sensor node may be an oscillator, a turnaround time, a processing time, a preamble time, and the like.

For example, in response to the beacon transmission period being $T_b$ seconds (sec) and a synchronization error per section being ±s μsec/sec, a maximum error occurring during the beacon transmission period may be $\pm T_b \times s$ μsec.

In the uplink section, the coordinator may receive a signal having a short transmission time ($T_u$) and thus, a length of the uplink section may be $2 \times T_b \times s + T_u$ μsec. In the downlink section, the coordinator may transmit a synchronization packet having a transmission time ($T_d$) and thus, a length of the downlink section may be $2 \times T_b \times s + T_d$ μsec.

The length of the uplink section and the length of the downlink section may be determined based on the performance of hardware and the operating environment.

Figure 4:
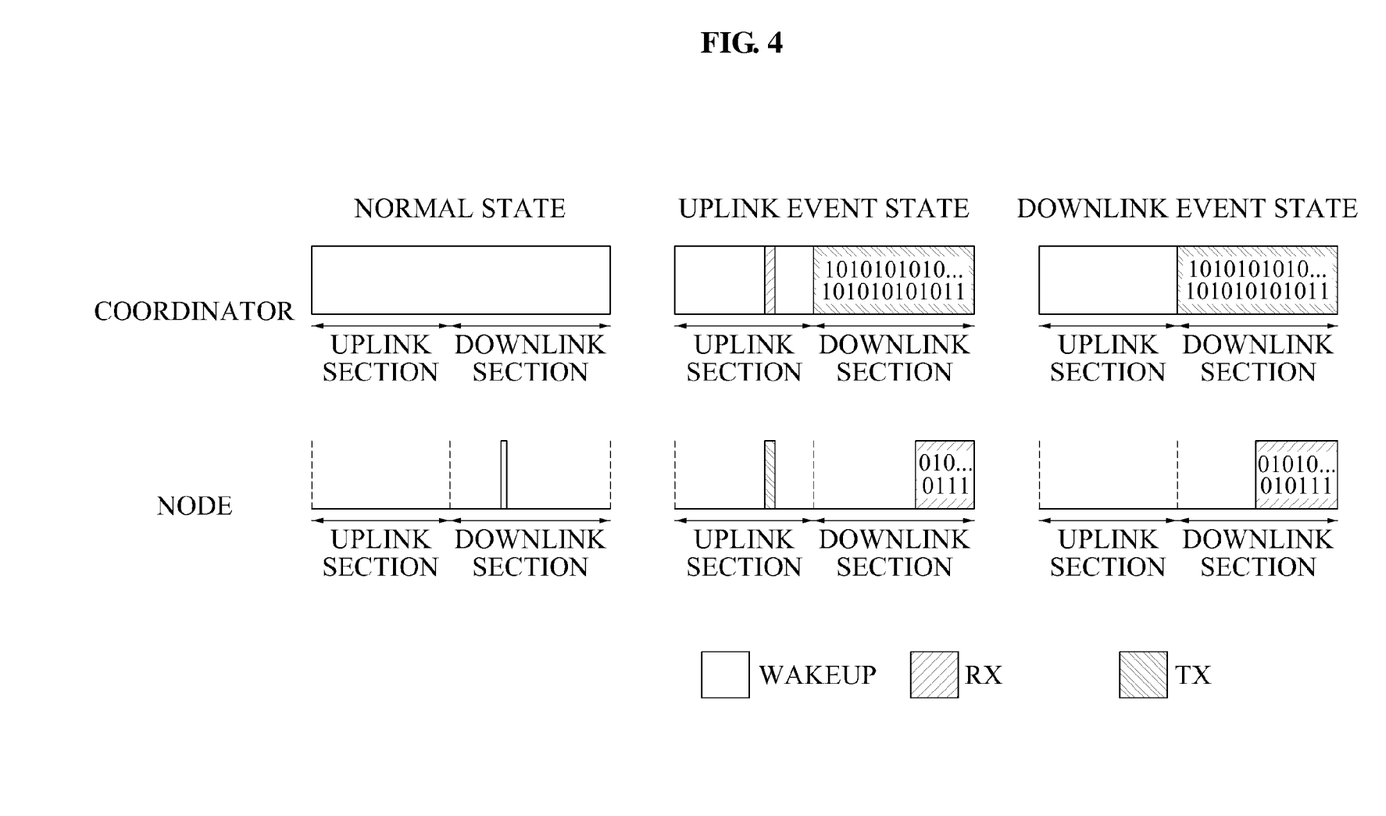
FIG. 4 is a diagram illustrating an example of an operation of a coordinator and an operation of a sensor node in a SS, based on an event state.

FIG. 4 illustrates an operation of a coordinator and an operation of a sensor node in a SS, based on an event state.

Referring to FIG. 4, the operations of the coordinator and the sensor node in the SS may be classified into three cases based on the event state. The event state may include a normal state, an uplink event state, and a downlink event state.

1) Normal State

A normal state may relate to a case where periodic data is generated, and only one of an uplink event and a downlink event occurs. In other word, both an uplink and a downlink event does not occur.

In an uplink section, the coordinator may not be aware of the occurrence of the uplink event in the sensor node and thus, the coordinator may be in a wake-up mode to receive, from the sensor node, information associated with whether the uplink event occurs. The sensor node may be in a sleep mode in response to the uplink event not occurring.

In a downlink section, the coordinator may be in a sleep mode in response to the uplink event and the downlink event not occurring. The sensor node may not be aware of the occurrence of the downlink event and thus, the sensor node may be in a wake-up mode for a short time to sense whether the down link event occurs and may change the wake-up mode to a sleep mode after sensing that the downlink event has not occurred. An event may not frequently occur in a WBAN application and thus, a ratio of the normal state to event state may be high.

2) Uplink Event State

An uplink event state may relate to a case where a sensor node informs the coordinator of the uplink event. In this case, an uplink event may occur among sensor nodes. An example of an uplink event may be a patient emergency.

In response to the uplink event occurring, the sensor node may transmit a signal to the coordinator. The signal may indicate an occurrence of the uplink event during a short time in the uplink section. In this example, the signal may inform the coordinator of the occurrence of the uplink event. Thus, the signal may be simply transmitted in a form of energy. The signal may indicate the occurrence of the uplink event. The uplink event may be a simple signal having a predetermined value. In other words, the signal may be compared against a threshold.

The coordinator may perform energy detection in the uplink section. As another aspect, in response to the coordinator sensing a signal having an energy greater than or equal to the threshold, the coordinator may recognize an occurrence of the uplink event. The coordinator may transmit a packet for synchronization to sensor nodes in the downlink section. In this example, the coordinator may transmit the packet for the synchronization more than one time. In order for the sensor node to identify the coordinator, the packet for the synchronization may include a code pattern. The sensor node may use the code pattern to identify the coordinator.

In the downlink section, in response to the sensor node that is in the wake-up mode sensing downlink transmission from the coordinator, the sensor node may receive the packet for synchronization. The downlink transmission from the coordinator may be a signal transmission.

In response to uplink events occurring in a plurality of sensor nodes, each of the plurality of nodes may transmit a signal indicating an occurrence of an uplink event in the same uplink section. In this example, the coordinator may receive a signal having energy greater than or equal to the threshold in the uplink section. Thus, the coordinator may not be aware in which of the plurality of sensor nodes an uplink event occurs. As another aspect, the coordinator may be aware of an occurrence of an uplink event. Therefore, although a number of sensor nodes increases, the length of the SS may be maintained instead of increasing the length.

In response to the coordinator performing energy detection in the uplink section, the coordinator may distinguish interference and a signal transmitted from the sensor node. The distinguishing may be based on a length of a section where the signal having energy greater than or equal to the threshold is received. In response to the length of the section where the signal having energy greater than or equal to the threshold is sensed being in a predetermined range, the coordinator may recognize the occurrence of the uplink event. Otherwise, the coordinator may determine the occurrence of interference or noise, and no occurrence of an uplink event.

For example, in response to a length of a section where the sensor node transmits the signal indicating occurrence of the uplink event ($T_{up}$) and the signal having energy greater than or equal to the threshold being received during a time in a range of ($T_{up}$-a) and (Tup+b), the coordinator may recognize an occurrence of the uplink event. In this example, 'a' may relate to a received signal processing feature of the coordinator and 'b' may relate to a beacon transmission period.

In response to the coordinator using the method described in the forgoing, error in energy detection due to the interference may be reduced. In this example, unnecessary transmission and reception caused by the error in the energy detection may be prevented. Thus, energy consumption may be reduced.

3) Downlink Event State

A downlink event state may relate to a state for processing a case where a downlink event occurs in the coordinator. For example, the downlink event may be an event where a user presses a button on a cellular phone.

In response to the downlink event occurring, the coordinator may transmit a synchronization packet to sensor nodes in the downlink section, and the coordinator may inform the sensor nodes of occurrence of the downlink event.

Figure 5:
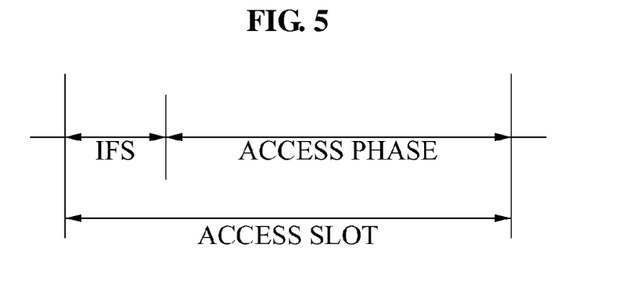
FIG. 5 is a diagram illustrating an example of an access slot (AS)

FIG. 5 illustrates an example of an access slot (AS).

Referring to FIG. 5, a sensor network may enable a coordinator to determine a sensor node in which an uplink event occurs, or enable the coordinator to be aware of whether or not the sensor node recognizes a downlink event state.

In response to the sensor node receiving a synchronization packet in a downlink section or in response to the sensor node being a time set in a beacon period, an operation in the AS is started.

The sensor node may wait for an inter frame space (IFS) for synchronization. In response to traffic to be transmitted existing, the sensor node may transmit an access request frame to the coordinator. The access request frame may include identification (ID) information associated with a sensor node. The coordinator may receive the access request frame that the sensor node transmits during an access phase.

Each sensor node may transmit an access request frame using a corresponding section in the AS. The section may be allocated, in advance, for each sensor node, so that conflict between sensor nodes may be prevented. An access request frame transmission section for each sensor node may be sequentially determined based on an ID of a corresponding sensor node. Accordingly, a length of the access phase may be determined based on a number of sensor nodes included in the sensor network. For example, in response to a number of sensor nodes being Nn, an access request frame being Fa bits, and a data rate being r bit/sec, the length of the access phase may be determined as Nn×Fa×(1/r) sec.

In response to an uplink event or a downlink event being sensed in the SS, the coordinator may transmit a beacon including scheduling information for transmitting the uplink event and the downlink event, regardless of a beacon transmission period. The uplink event and the downlink event may not often occur. Thus, overhead due to the transmission of the new beacon may be small.

The sensor node may minimize an amount of time expended for operating in a wake-up mode to sense an event. Thus, energy efficiency may be improved.

The sensor network may be an asymmetric energy consumption network. The asymmetric energy consumption network may minimize energy consumption of the sensor node and energy consumption may be concentrated in the coordinator that is readily charged, such as a cellular phone.

Hereinafter, a conventional WOR scheme and a bidirectional event transmission scheme are described with reference to FIGS. 6 and 7.

Figure 6:
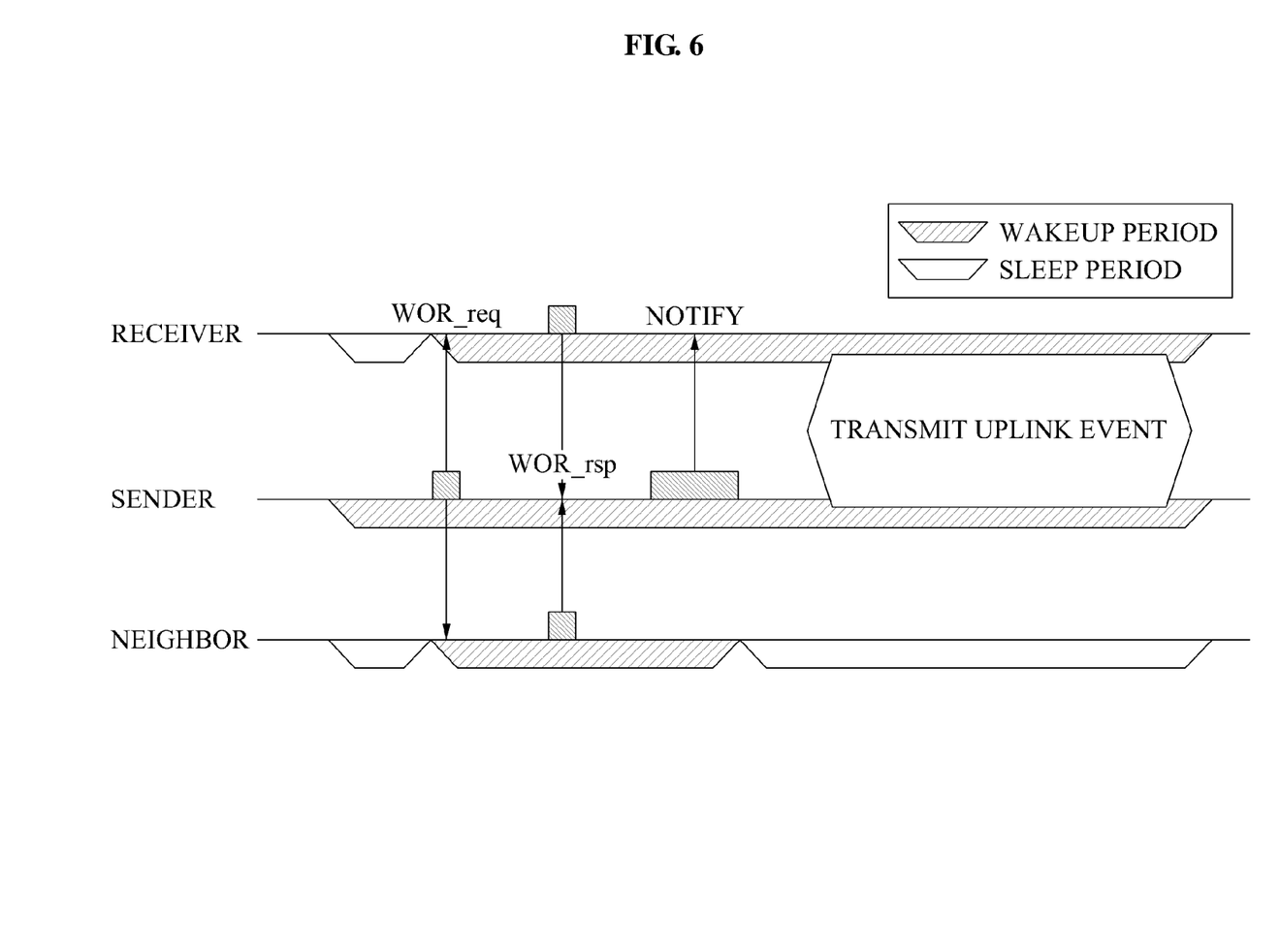
FIG. 6 is a diagram illustrating an example of transmitting and receiving energy based on a WOR scheme.

FIG. 6 illustrates an example of transmitting and receiving energy based on a WOR scheme.

Referring to FIG. 6, a sender in the WOR scheme may transmit predetermined energy (WOR_req) to wake up a receiver, and, in response to the receiver retransmitting a response (WOR_rsp) with respect to WOR_req, the receiver may transmit, to the receiver, an information packet, to obtain parameters that are used for transmission of a node ID and the like. As another aspect, overhead may occur in a neighbor node due to overhearing with respect to WOR_req.

According to energy consumption for each node, the sender may perform single energy transmission, single energy reception, and single control packet transmission. The receiver may consume energy in an opposite direction to a direction of transmission and reception of the sender.

Therefore, the WOR scheme may not be appropriate for a WBAN environment. Since the energy consumption of the sender and the receiver may be symmetric, a sensor node attached to a human may suffer lack of energy. In terms of a directionality of event transmission, the WOR scheme may support a unidirectional event transmission. The event transmissions may be an uplink and a downlink. Thus, the WOR scheme may perform event recognition two times in a bidirectional event transmission network. In response to events simultaneously occurring in a plurality of senders, the receiver may not readily recognize occurrence of an event. In the WOR scheme, the neighbor node may unnecessarily receive WOR_req and transmit WOR_rsp. Thus, energy may be wasted, due to transmission of an adjacent sender. The wasted energy may increase in response to a number of nodes included in the sensor node increasing.

Figure 7:
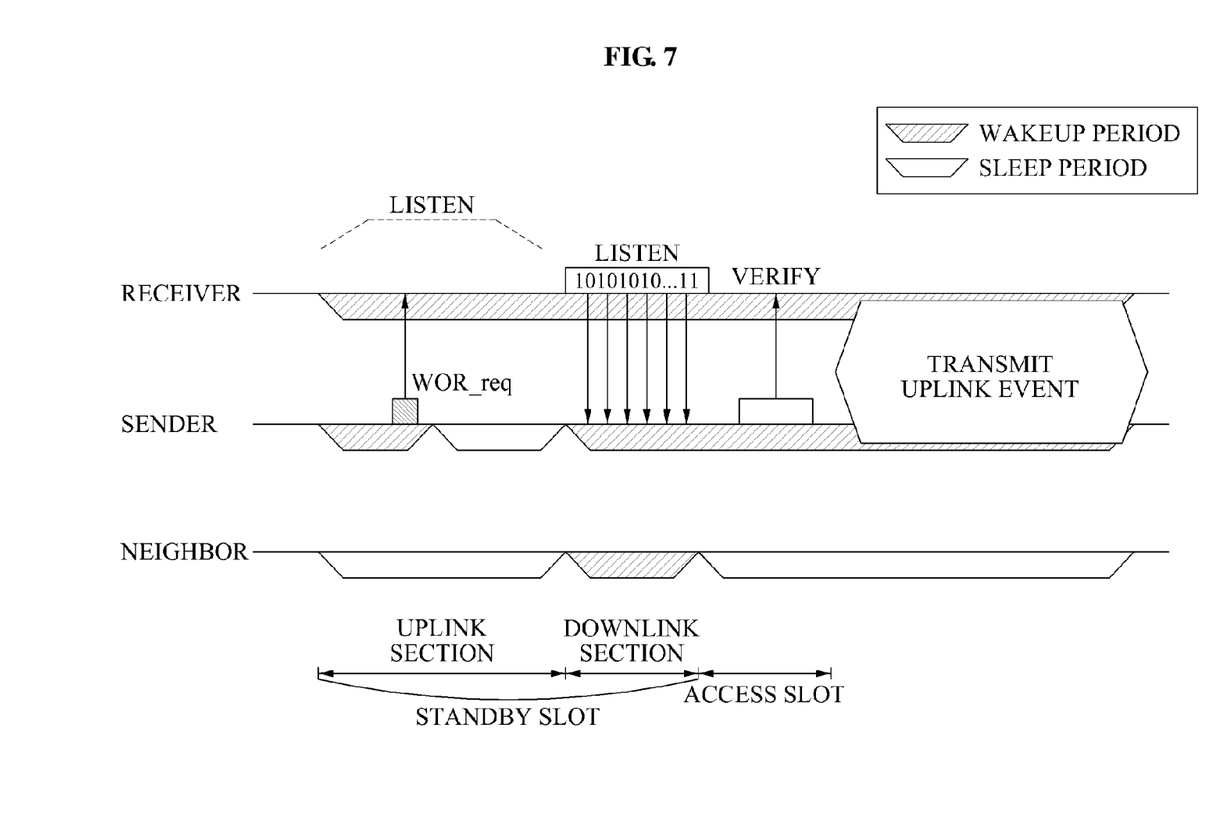
FIG. 7 is a diagram illustrating an example of energy transmission and reception of a bidirectional event transmission sensor network.

In response to an event transmission method of the bidirectional event transmission sensor network being applied to the WBAN, at least the following effects may be obtained in comparison to the conventional WOR scheme.

reduction of energy in response to bidirectional events, that is, an uplink event and a downlink event, occurring simultaneously using a code matching scheme to reduce a probability of a false alarm fluidly operating an AS to increase reliability of event data concentrating energy consumption in a coordinator to reduce energy of sensor node that is attached to a human body minimization of data transmission of a neighbor that is not related to an event FIG. 7 illustrates an example of energy transmission and reception of a bidirectional event transmission sensor network.

The bidirectional event transmission sensor network may be bi-directional and thus, may simultaneously transmit bi-directional events. The bi-directional events may be an uplink event and a downlink event. Therefore, a number of transmissions and receptions is halved in comparison to the number of transmissions and receptions in a WOR scheme. Thus, a reduction in energy may occur.

Referring to FIG. 7, a coordinator may transmit a code pattern to a sensor node, that is, a sender, in a downlink section. The code pattern may include ID information associated with the coordinator. Thus, a probability of a false alarm due to interference may be reduced.

Here, event data is transmitted to the coordinator based on a contention-free scheme. Thus, even though a plurality of sensor nodes may transmit uplink events, a reliability of the data transmission may increase.

Unlike the WOR scheme, a neighbor node in which an event does not occur may not perform a transmission. Accordingly, overhead may be reduced in comparison to the WOR scheme. In this example, the neighbor node may relate to a sensor node that is connected to another coordinator that is different from the coordinator of FIG. 7.

In FIG. 7, the coordinator may perform downlink transmission only in response to an event occurring. Even though, in a WBAN, a frequency of the event may be low, a frequency of the coordinator performing a downlink transmission may increase in response to energy being frequently detected due to an effect from external interference and the like. In this example, an energy loss may occur since an energy transmission period of the coordinator is long. Overlapping an uplink listen section and an uplink section may reduce the energy loss. In response to the coordinator performing downlink transmission immediately after the sender transmits WOR_req, the uplink section may be reduced. The neighbor node may not be aware of an exact uplink time of the sender. Thus, the neighbor node may have idle listening for a time corresponding to ([Actual uplink time]−[uplink start time]). The overlap may reduce the energy consumption of the coordinator. As another aspect, the overlap may also increase the energy consumption of the neighbor node. Thus, the overlap may need to be appropriately used.

Figure 8:
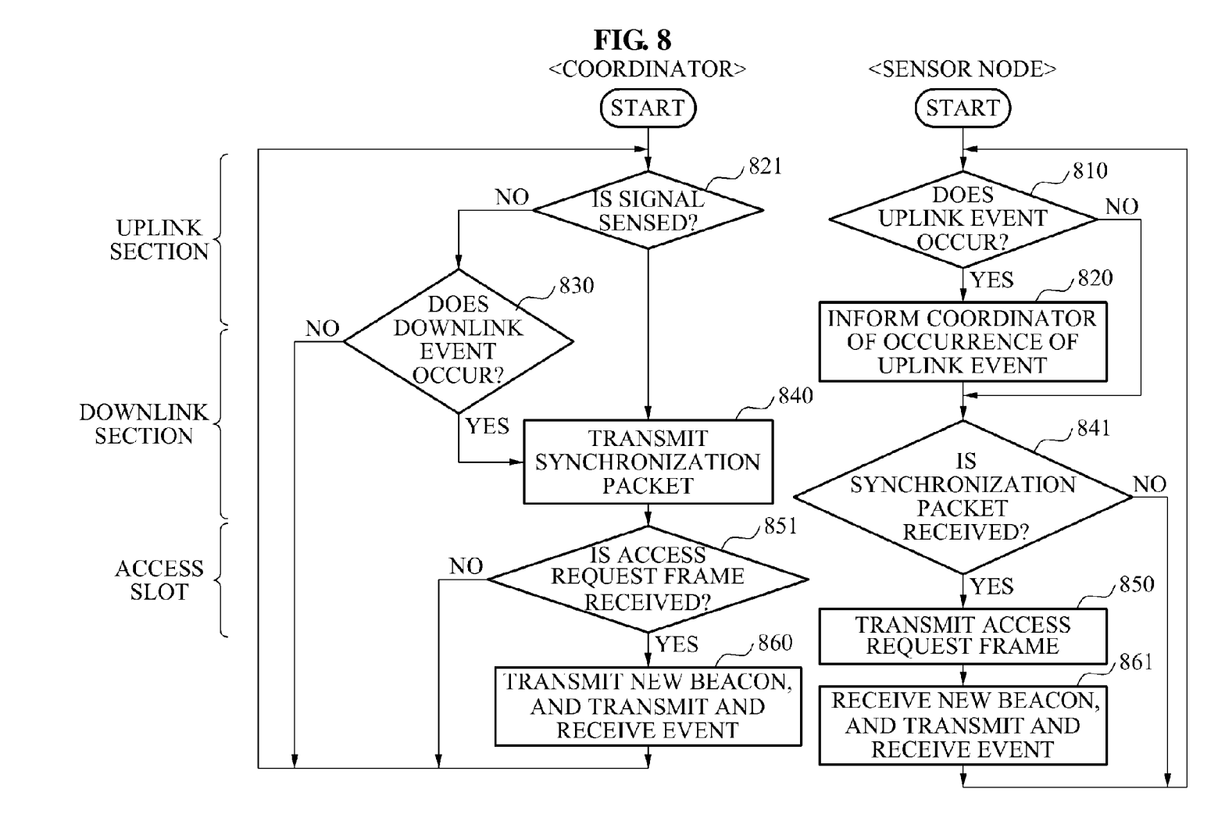
FIG. 8 is a flowchart illustrating an example of an operation of a bidirectional event transmission sensor network.

FIG. 8 illustrates an operation of a bidirectional event transmission sensor network.

Referring to FIG. 8, a sensor node monitors whether or not an uplink event has occurred in operation 810. In response to the uplink event occurring, the sensor node may inform a coordinator of an occurrence of the uplink event in an uplink section in operation 820. The sensor node may transmit, to the coordinator, a signal having energy greater than or equal to a predetermined magnitude. The signal may inform the coordinator of the occurrence of the uplink event. As another aspect, the sensor node may change from a sleep mode state to a wake-up mode state, may transmit the signal to the coordinator, and may revert back to the sleep mode state. In response to the uplink event not occurring, the sensor node may operate in the sleep mode in the uplink section.

The coordinator may sense whether the signal having energy greater than or equal to the predetermined magnitude is received, in the uplink section in operation 821. Here, the coordinator maintains the wake-up mode in the uplink section. In response to the coordinator sensing the signal having energy greater than or equal to the predetermined magnitude in the uplink section, the coordinator may transmit a synchronization packet to the sensor node in a downlink section in operation 840. In response to the signal having energy greater than or equal to the predetermined magnitude being received, the coordinator may recognize the uplink event occurring. In response to the signal having energy greater than or equal to the predetermined magnitude being received during a time greater than or equal to a threshold, the coordinator may recognize the occurrence of interference. The coordinator may filter the signal recognized as the interference. Thus, the coordinator may determine that the uplink event has not occurred. The synchronization packet may include a code pattern for identifying the coordinator. The coordinator may transmit the synchronization packet more than one time, so that sensor nodes that are not synchronized may receive the synchronization packet.

The coordinator may sense whether a downlink event occurs in operation 830. In response to the downlink event occurring, the coordinator may also transmit the synchronization packet in operation 840.

In the downlink section, the sensor node may sense whether downlink transmission is performed from the coordinator to the sensor node. In other words, the sensor node may sense whether the synchronization packet is received, in operation 841. In response to the downlink transmission being sensed, the sensor node may receive the synchronization packet. In response to the downlink transmission not being sensed, the sensor node may operate in a sleep mode.

The sensor node that receives the synchronization packet may transmit, to the coordinator, an access request frame, in operation 850. The access request frame may include ID information associated with the sensor node. The sensor node may transmit the access request frame using a section allocated for the corresponding sensor node among sections in an AS.

The coordinator may sense whether the access request frame is received in operation 851. In response to the access request frame being received, the coordinator may transmit new beacon information including scheduling information to the sensor node, and may receive the uplink event or may transmit the downlink event, based on the scheduling information, in operation 860.

The sensor node may receive the new beacon information and the sensor node may, based on the scheduling information, transmit the uplink event or receive the downlink event, in operation 861.

Figure 9:
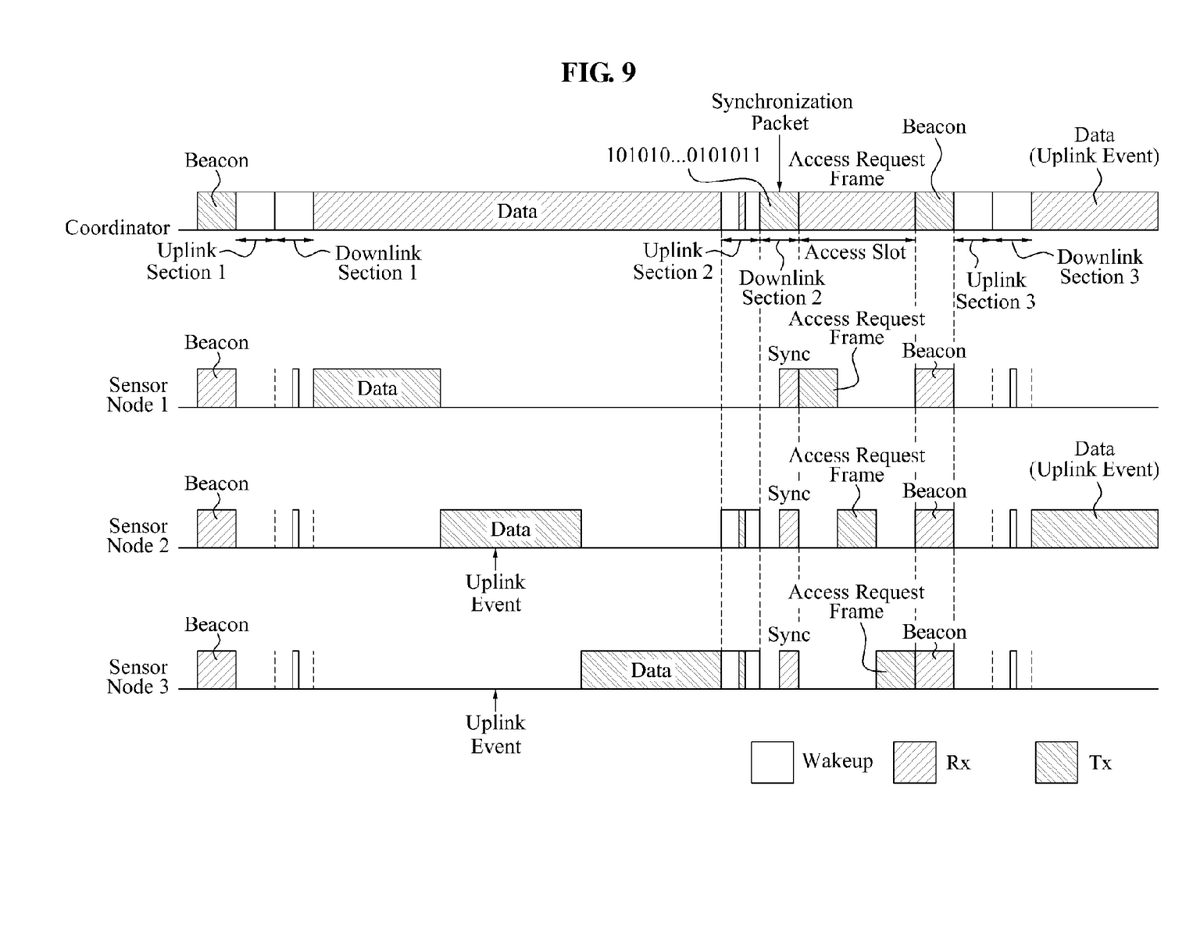
FIG. 9 is a diagram illustrating an example of transmission of an uplink event in a bidirectional event transmission sensor network.

FIG. 9 illustrates an example of transmission of an uplink event in a bidirectional event transmission sensor network.

In this example, uplink event transmission in response to an uplink event occurring only in a sensor node 2 and a sensor node 3 among sensor nodes that are connected to a coordinator will be described with reference to FIG. 9.

In an uplink section 2, each of the sensor node 2 and the sensor node 3 may transmit, to the coordinator, a signal having energy greater than or equal to a predetermined magnitude, to inform the coordinator of occurrence of the uplink event. The coordinator may recognize the occurrence of the uplink event based on receiving the signal.

In a downlink section 2, the coordinator may transmit a synchronization packet to sensor nodes.

Here, each of the sensor nodes receiving the synchronization packet may transmit an access request frame to the coordinator. The synchronization packet may be transmitted using a section allocated to a corresponding sensor node. The access request frame may include information associated with whether an uplink event occurs in a corresponding sensor node, and the access request frame may also include information associated with whether the synchronization packet is received. A sensor node in which an uplink event has not occurred may also transmit an access request frame and thus, the coordinator may recognize that the sensor node 1 normally receives the synchronization packet. In other words, the sensor node 1 receiving the synchronization packet may indicate that a connection is good.

Subsequently, the coordinator may transmit a new beacon that is generated based on the received access request frame.

Each of the sensor node 2 and the sensor node 3 may transmit a corresponding uplink event to the coordinator based on scheduling information included in the new beacon. Although it is not illustrated in FIG. 9, the sensor node 3 may transmit the uplink event of the sensor node 3 after the sensor node 2 completes transmission of the uplink event of the sensor node 2.

Figure 10:
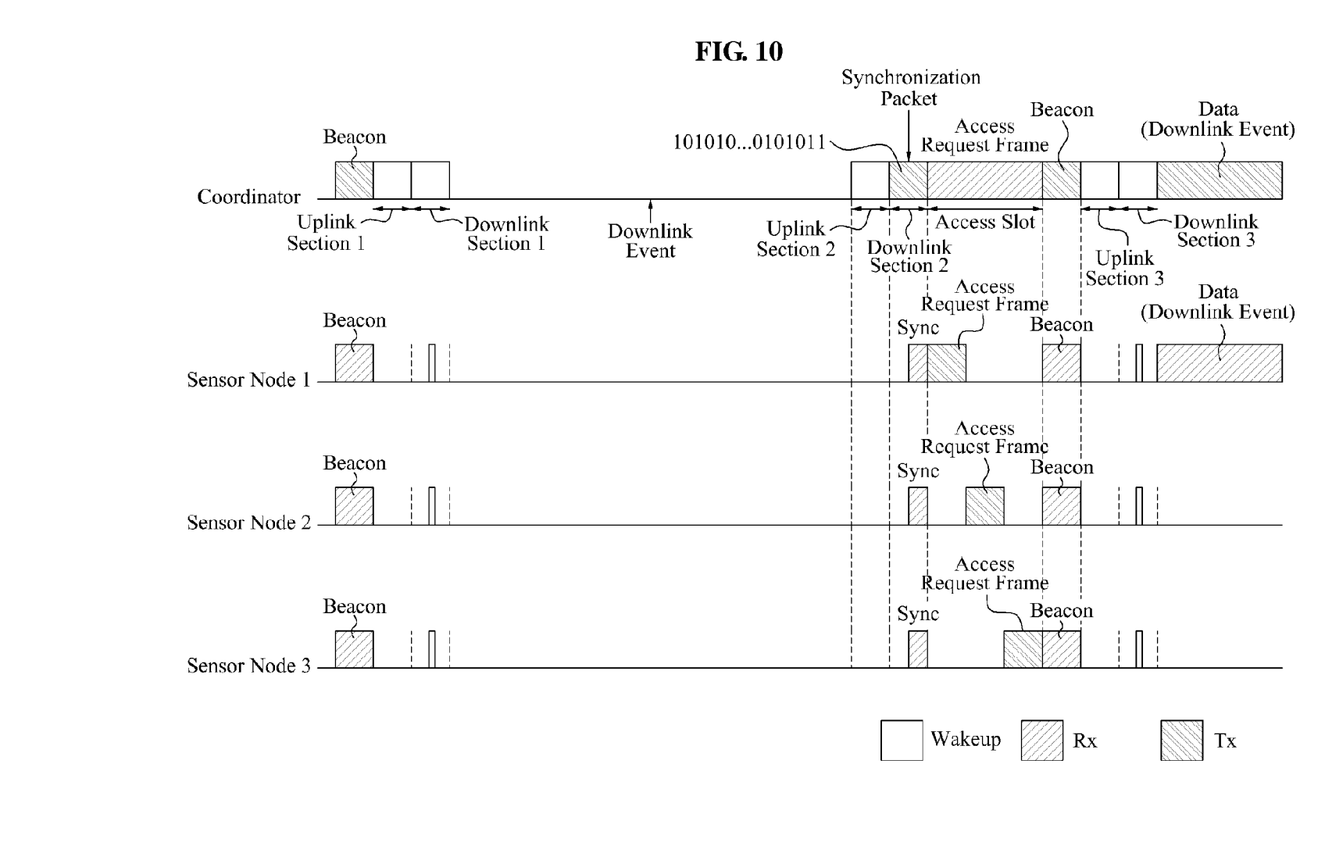
FIG. 10 is a diagram illustrating an example of transmission of a downlink event in a bidirectional event transmission sensor network.

FIG. 10 illustrates an example of transmission of a downlink event in a bidirectional event transmission sensor network.

Referring to FIG. 10, in an uplink section, sensor nodes may operate in a sleep mode since there is no occurrence of an uplink event. The sensor nodes may be a sensor node 1 through a sensor node 3.

In a downlink section 2, a coordinator may transmit a synchronization packet to the sensor nodes.

Each of the sensor nodes that receive the synchronization packet may transmit an access request frame to the coordinator using a section allocated to a corresponding sensor node. The coordinator may transmit a new beacon for downlink event transmission, based on the received access request frame.

The coordinator may transmit a downlink event to sensor nodes, based on scheduling information included in the new beacon. The sensor nodes may receive the downlink event based on the scheduling information. In this example, the coordinator may transmit the downlink event more than one time.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable recording mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running. A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method of a coordinator in a bidirectional event transmission sensor network comprising a sensor node and the coordinator, the method comprising:
sensing, in an uplink section, whether a signal having energy greater than or equal to a predetermined magnitude is received, the signal indicating occurrence of an uplink event detected by the sensor node; and
transmitting, to the sensor node in a downlink section, a synchronization packet that is used to receive the uplink event and/or to transmit a downlink event, in response to the coordinator detecting the downlink event or the signal having energy greater than or equal to the predetermined magnitude being received in the uplink section,
wherein the bidirectional event transmission sensor network has a structure of a super frame that comprises at least one standby slot (SS) comprising the uplink section and the downlink section,
wherein the transmitting comprises transmitting the synchronization packet in the downlink section more than once, such that the sensor node that is not synchronized receives the synchronization packet,
wherein in the each section, a mode of the coordinator and the plurality of sensor nodes is determined based on whether or not the uplink event or the downlink event occurs, and
wherein in response to the downlink event occurring, in the uplink section the coordinator and the plurality of sensor nodes maintain sleep mode.

2. The method of claim 1, wherein the sensing comprises:
maintaining a wake-up mode in the uplink section, to sense whether the uplink event occurs.

3. The method of claim 1, wherein the sensing comprises:
recognizing that the uplink event occurs in response to the signal having energy greater than or equal to the predetermined magnitude being received during a predetermined time range.

4. The method of claim 1, wherein the SS is configured to process an aperiodic event.

5. The method of claim 1, wherein the coordinator is configured to distinguish interference from the signal based on the received signal being less than the predetermined magnitude.

6. A communication method of a coordinator in a bidirectional event transmission sensor network comprising a sensor node and the coordinator, the method comprising:
sensing, in an uplink section, whether a signal having energy greater than or equal to a predetermined magnitude is received, the signal indicating occurrence of an uplink event detected by the sensor node; and
transmitting, to the sensor node in a downlink section, a synchronization packet that is used to receive the uplink event and/or to transmit a downlink event, in response to the coordinator detecting the downlink event or the signal having energy greater than or equal to the predetermined magnitude being received in the uplink section,
wherein the bidirectional event transmission sensor network has a structure of a super frame that comprises at least one standby slot (SS) comprising the uplink section and the downlink section,
wherein the transmitting comprises transmitting the synchronization packet in the downlink section more than once, such that the sensor node that is not synchronized receives the synchronization packet, and
wherein the sensing comprises: recognizing that the uplink event does not occur in response to the signal having energy greater than or equal to a certain magnitude being received during a time greater than or equal to a threshold time.

7. The method of claim 1, wherein a length of the SS is determined, in advance, regardless of a number of sensor nodes included in the sensor network.

8. The method of claim 1, wherein the transmitting comprises:
transmitting the synchronization packet comprising a code pattern that identifies the coordinator.

9. The method of claim 1, further comprising:
receiving, in an access slot included in the super frame, an access request frame comprising identification information of the sensor node, from the sensor node that receives the synchronization packet.

10. A communication method of a coordinator in a bidirectional event transmission sensor network comprising a sensor node and the coordinator, the method comprising:
sensing, in an uplink section, whether a signal having energy greater than or equal to a predetermined magnitude is received, the signal indicating occurrence of an uplink event detected by the sensor node;
transmitting, to the sensor node in a downlink section, a synchronization packet that is used to receive the uplink event and/or to transmit a downlink event, in response to the coordinator detecting the downlink event or the signal having energy greater than or equal to the predetermined magnitude being received in the uplink section,
wherein the bidirectional event transmission sensor network has a structure of a super frame that comprises at least one standby slot (SS) comprising the uplink section and the downlink section,
wherein the transmitting comprises transmitting the synchronization packet in the downlink section more than once, such that the sensor node that is not synchronized receives the synchronization packet;
receiving, in an access slot included in the super frame, an access request frame comprising identification information of the sensor node, from the sensor node that receives the synchronization packet;
transmitting a beacon comprising scheduling information that is used to transmit the downlink event and/or to receive the uplink event, in response to the reception of the access request frame; and
performing, based on the scheduling information, transmission of the downlink event to the sensor node and/or reception of the uplink event from the sensor node.

11. A communication method of a coordinator in a bidirectional event transmission sensor network comprising sensor nodes and the coordinator, the method comprising:
receiving, in an uplink section from a sensor node among the sensor nodes that detects an uplink event, a signal having energy greater than or equal to a predetermined magnitude, the signal indicating that the uplink event occurs; and
transmitting, in a downlink section to the sensor node, a synchronization packet that is used to receive the uplink event and/or to transmit a downlink event, in response to the signal having energy greater than or equal to the predetermined magnitude being received or the downlink event detected by the coordinator occurring, wherein the bidirectional event transmission sensor network has a structure of a super frame that comprises at least one standby slot comprising the uplink section and the downlink section, and wherein the transmitting comprises transmitting the synchronization packet in the downlink section more than once, such that the sensor node that is not synchronized receives the synchronization packet, wherein in the each section, a mode of the coordinator and the plurality of sensor nodes is determined based on whether or not the uplink event or the downlink event occurs, and wherein in response to the downlink event occurring, in the uplink section the coordinator and the plurality of sensor nodes maintain sleep mode.

12. The method of claim 11, wherein the synchronization packet comprises a code pattern that identifies the coordinator.

13. The method of claim 11, further comprising:
receiving, in an access slot (AS) included in the super frame, an access request frame comprising identification information of the sensor node, from the sensor node that receives the synchronization packet.

14. The method of claim 13, wherein the receiving comprises:
receiving, from the sensor node, the access request frame, using a section allocated to the sensor node among sections respectively allocated to the sensor nodes that are included in the AS.

15. The method of claim 11, wherein the period of the standby slot is determined by a maximum delay time to process the uplink event or the downlink event.

16. A communication method of a coordinator in a bidirectional event transmission sensor network comprising sensor nodes and the coordinator, the method comprising:
receiving, in an uplink section from a sensor node among the sensor nodes that detects an uplink event, a signal having energy greater than or equal to a predetermined magnitude, the signal indicating that the uplink event occurs;
transmitting, in a downlink section to the sensor node, a synchronization packet that is used to receive the uplink event and/or to transmit a downlink event, in response to the signal having energy greater than or equal to the predetermined magnitude being received or the downlink event detected by the coordinator occurring,
wherein the bidirectional event transmission sensor network has a structure of a super frame that comprises at least one standby slot comprising the uplink section and the downlink section, and
wherein the transmitting comprises transmitting the synchronization packet in the downlink section more than once, such that the sensor node that is not synchronized receives the synchronization packet;

receiving, in an access slot (AS) included in the super frame, an access request frame comprising identification information of the sensor node, from the sensor node that receives the synchronization packet;

transmitting, to the plurality of sensor nodes by the coordinator, a beacon including scheduling information for transmitting the downlink event or for receiving the uplink event, in response to reception of the access request frame; and performing, based on the scheduling information, transmission of the downlink event from the coordinator to the plurality of sensor nodes or transmission of uplink event from the at least one sensor node detecting the uplink event to the coordinator.

17. A communication method of a coordinator in a bidirectional event transmission sensor network comprising sensor nodes and the coordinator, the method comprising:
receiving, in an uplink section from a sensor node among the sensor nodes that detects an uplink event, a signal having energy greater than or equal to a predetermined magnitude, the signal indicating that the uplink event occurs; and
transmitting, in a downlink section to the sensor node, a synchronization packet that is used to receive the uplink event and/or to transmit a downlink event, in response to the signal having energy greater than or equal to the predetermined magnitude being received or the downlink event detected by the coordinator occurring,
wherein the bidirectional event transmission sensor network has a structure of a super frame that comprises at least one standby slot comprising the uplink section and the downlink section,
wherein the transmitting comprises transmitting the synchronization packet in the downlink section more than once, such that the sensor node that is not synchronized receives the synchronization packet,
wherein in the each section, a mode of the coordinator and the plurality of sensor nodes is determined based on whether or not the uplink event or the downlink event occurs, and
wherein if both the uplink event and the downlink event do not occur, then in the uplink section, the coordinator maintains wake-up mode and the plurality of sensor nodes maintain sleep-mode, and in the downlink section, the coordinator maintains sleep mode and the plurality of sensor nodes maintain wake-up mode only for a predetermined time.

* * * * *